United States Patent Office 2,904,473
Patented Sept. 15, 1959

2,904,473
SELECTION OF CORN STEEP LIQUOR BY MEASUREMENT OF OXIDATION-REDUCTION POTENTIAL

Stephen Aloysius Szumski, Pearl River, N.Y., assignor to American Cyanamid Company, New York, N.Y., a corporation of Maine No Drawing. Application August 12, 1953
Serial No. 373,883

5 Claims. (Cl. 195—103)

This invention relates to the selection of corn steep liquor for the growth of micro-organisms of the genus Streptomyces in a nutrient medium containing corn steep liquor by the choice of a corn steep liquor having such an oxidation-reduction potential that high yields of a desired elaboration product are obtained.

One such antibiotic is chlortetracycline which is produced by the organism Streptomyces aureofaciens as described in U.S. Patent 2,482,055 entitled "Aureomycin and Preparation of Same," to Benjamin M. Duggar, dated September 13, 1949.

Chlortetracycline is produced and sold under the commercial designation of "Aureomycin" which name, in certain countries, is a trademark of the American Cyanamid Company. Chlortetracycline has been found to be a naphthacene derivative and while having a structure which strongly suggests tautomeric forms, is believed to exist with the following probable structure:

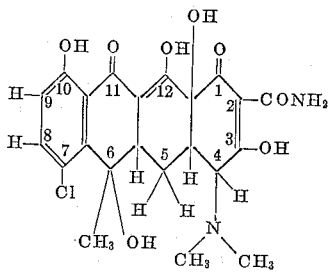

A numbering system is shown for the molecule. One proper name for the compound is 7-chloro-4-dimethylamino - 1,4,4a,5,5a,6,11,12a - octahydro - 3,6,10,12,12a-pentahydroxy - 6 - methyl-1,11-dioxo-2-naphthacenecarboxamide. The official generic term for the compound is chlortetracycline, sometimes spelled "chlorotetracycline," which is consistent with the name oxytetracycline for "Terramycin" as suggested in the Journal of the American Chemical Society, 74: 4976 (1952).

Further deails of a medium particularly suited for the growth of Streptomyces aureofaciens are described in the U.S. patent to J. G. Niedercorn, 2,609,329 entitled "Process of Producing Aureomycin," September 2, 1952.

Other Streptomyces, such as Streptomyces griseus which produces streptomycin, and Streptomyces rimosus, which produces oxytetracycline, also respond to the selected corn step liquor.

Corn steep liquor is an ingredient of many fermentation media for Streptomyces. Corn steep liquor is a natural product and varies in composition. Not too surprising, variations in the yields of antibiotics have resulted from the variation in the composition of the corn steep liquor. Previously there has been no method of selecting the more desirable corn steep liquors other than actual fermentation experiments. Such experiments are slow, costly and the results on a small scale may not be completely duplicated in large scale procedures, so that undesirably large variations in yields result from the variation in the corn steep liquor.

The oxidation-reduction potential of corn steep liquor is an excellent guide to the selection of those corn steep liquors which give a maximum antibiotic yield. The oxidation-reduction potential may be measured very conveniently by determining the potential of a precious metal electrode, such as a platinum metal electrode, as compared with a hydrogen electrode. More conveniently, the potential of the platinum metal electrode is measured against a saturated calomel electrode and this potential may be used directly for selection of the corn steep. The potential so measured may be converted to an Eh or rH value, by suitable calculations, and such values have more theoretical significance; but the conversion is unnecessary, as the relative value is of importance, for the present purposes.

The potential of a saturated calomel electrode as compared with the standard hydrogen electrode, is given by the formula:

$$E = 260.1 - 0.6060t - 0.001092t^2$$

where "E" is in millivolts and "t" in degrees centigrade. The reading in millivolts may be converted to Eh by converting to volts and adding, with due regard for signs, the potential of the calomel electrode as determined by the above formula.

For purposes of convenience, determinations may be made at 22° C. Potentiometers for measuring the voltage are well known commercially. A standard industrial Beckman Model M pH meter was used, replacing the glass electrode with a platinum electrode, and determining the reading on a millivolt scale. As all readings may be made at 22° C. and as the corrections would then be standard, direct readings in millivolts are used as a basis for comparison.

The potential values so measured are an excellent indication of the antibiotic yields which may be expected from the corn steep liquor in plant production. The corn steep should not be aerated or subjected to oxidizing or reducing conditions prior to the measurement of the potential of the platinum electrode, inasmuch as such oxidizing or reducing conditions may shift the oxidation-reduction potential of the corn steep liquor without a corresponding effect on its desirability as a fermentation medium component. It is preferred that the samples for testing be uniformly obtained, and stored and shipped in filled glass containers with plastic lined covers to avoid potential changes due to shipping and storage conditions.

The pH of corn steep liquor is so constant that the potential for present purposes may be measured without being unduly affected thereby.

Other precious metals may be used as the electrode, or colored indicators may be used, as it is the potential itself, and not the method of ascertaining the potential that is critical.

Example 1

Twenty-thousand-gallon fermenters were filled with a charge consisting of:

| | |
|---|---|
| Starch _____ lbs__ | 6700 |
| Corn steep liquor _____ gallons__ | 400 |
| Lard oil _____ do____ | 180 |
| CaCO₃ (precipitated) _____ lbs__ | 1350 |
| (NH₄)₂SO₄ _____ lbs__ | 500 |
| MgCl₂.6H₂O _____ lbs__ | 300 |
| NH₄Cl _____ lbs__ | 150 |

Water to make 20,000 gallons.
Trace elements as disclosed in the Niedercorn Patent 2,609,329, column 4, lines 45 to 50.

The mash was cooked for 30 minutes at 120° C., and after cooling, the tank was inoculated from a seed tank. Under conditions otherwise identical, the following yields of chlortetracycline were obtained from a series of charges.

The yields are expressed as a percentage of the lowest yield in the series, as due to the variations in the strain of *S. aureofaciens* and other conditions, results in such form are more indicative of the relative merits of the corn steeps than would be absolute yield figures.

The column "E" denotes the potential in millivolts measured at 22° C. of a platinum electrode against a saturated calomel electrode.

| E of Corn Steep Liquor, Millivolts | Yield of Chlortetracycline, Percent of Minimum Value |
| --- | --- |
| −235 | 115 |
| −207 | 290 |
| −196 | 100 |
| −176 | 345 |
| −175 | 360 |
| −170 | 285 |
| −166 | 400 |
| −164 | 315 |
| −153 | 405 |
| −144 | 440 |
| −140 | 445 |
| −138 | 420 |
| −134 | 425 |
| −130 | 405 |
| −130 | 485 |

As will be seen, the correlation is not perfect, as variations in the inoculum, contaminants, and other operating variables may decrease the maximum yields which may otherwise be expected, but it will be seen that higher yields may be expected from those corn steeps in which the potential shows the smallest negative value.

The choice of a preferred corn steep does not guarantee a high yield, but permits a high yield. Other factors may limit the yield, but by appropriate treatment of such other factors, then the potentialities of the corn steep may be utilized, and uniformly advantageous yields obtained.

While it is desired to use steeps showing the smallest negative value, commercial considerations of availability frequently render it necessary to use steeps to the value of up to about −170 millivolts.

*Example 2*

A similar series of runs were made using 25 milliliters of medium in 250 milliliter flasks, which were shaken on a rotary shaker at 26° C., wherein the effective diameter of the circular path described by the flasks was 2¼".

| E of Corn Steep Liquor | Yield of Chlortetracycline |
| --- | --- |
| −235 | 100 |
| −196 | 104 |
| −175 | 108 |
| −175 | 113 |
| −165 | 103 |
| −164 | 145 |
| −150 | 117 |
| −150 | 114 |
| −130 | 124 |
| −122 | 127 |
| −108 | 132 |
| −94 | 140 |

*Example 3*

A similar experiment was run using the same medium and the organism, *Streptomyces rimosus*, with the following results:

| E of Corn Steep Liquor | Yield of Oxytetracycline |
| --- | --- |
| −235 | 100 |
| −197 | 125 |
| −165 | 135 |
| −164 | 161 |
| −150 | 159 |
| −134 | 152 |
| −122 | 162 |
| −108 | 152 |
| −94 | 163 |

As will be seen, the correlation between the potential and the yield is very good considering that biological processes have frequently large and unexplainable variations.

While other factors may impose a limit on the yields which may be obtained, it can be seen that by a suitable choice of a corn steep liquor having the highest positive potential or the least negative potential it is possible to purchase and select corn steep liquor which gives a tremendous economic advantage in the production of the Streptomyces produced antibiotics.

It is desirable to use corn steeps with a value less negative than −100 millivolts, but commercial availability dictates the selection of those below about −170 in order that an adequate supply may be maintained.

Peculiarly enough, the change in the oxidation-reduction potential of the corn steep liquor does not appear to be of importance in the yields of fermentations which produce the vitamin, riboflavin. The producing organisms, of course, are of a different genus and do not appear to respond to the variation in the oxidation-reduction potential of the corn steep, as do the Streptomyces.

Having thus set forth by description and example certain aspects thereof, as my invention, I claim:

1. A method for the selection of a corn steep liquor which will give an improved yield of a desired elaboration product during the growth of an organism of the genus Streptomyces which comprises measuring the potential of a platinum electrode immersed therein against a saturated calomel electrode, and selecting a corn steep liquor in which the potential is more positive than −170 millivolts at 22° C.

2. A method for the selection of a corn steep liquor for use in the production of an antibiotic by the aerobic fermentation thereof with an organism of the genus Streptomyces which comprises the step of measuring the oxidation-reduction potential of said corn steep liquor and selecting for use in said fermentation process a corn steep liquor which has an oxidation-reduction potential more positive than −170 millivolts when measured at 22° C.

3. An improvement in the process of producing antibiotics with microorganisms of the genus Streptomyces by the aerobic fermentation of an aqueous nutrient medium which comprises the steps of measuring the oxidation-reduction potential of corn steep liquor and selecting as an ingredient for said nutrient solution corn steep liquor which has an oxidation-reduction potential more positive than −170 millivolts when measured at 22° C.

4. An improvement in the process of producing an antibiotic with the organism *Streptomyces aureofaciens* by aerobic fermentation of an aqueous nutrient medium the improvement which comprises the steps of measuring the oxidation-reduction potential of corn steep liquor and selecting as an ingredient for said nutrient solution corn steep liquor which has an oxidation-reduction potential more positive than −170 millivolts when measured at 22° C.

5. An improvement in the process of producing an antibiotic with the organism *Streptomyces rimosus* by aerobic fermentation of an aqueous nutrient medium the improvement which comprises the steps of measuring the oxidation-reduction potential of corn steep liquor and selecting as an ingredient for said nutrient solution corn steep liquor which has an oxidation reduction potential more positive than −170 millivolts when measured at 22° C.

References Cited in the file of this patent

UNITED STATES PATENTS 2,449,866    Waksman _____ Sept. 21, 1948

(Other references on following page)

| | | |
|---|---|---|
| 2,482,055 | Duggar | Sept. 13, 1949 |
| 2,483,892 | Ehrlich | Oct. 4, 1949 |
| 2,609,329 | Niedercorn | Sept. 2, 1952 |

OTHER REFERENCES

Porter: Bacterial Chemistry and Physiology, 1946, Wiley, pp. 46 to 57, 853.

Cardinal et al.: Jour. Biochem. Soc., 172, January-February 1948, pp. 609–612.

Werkman et al.: Bacterial Physiology, Academic Press, N.Y., 1951, pp. 152 to 156.

Florey et al.: "Antibiotics," vol. II, pp. 766 to 767.